C. FALKMAN.
Alcohol Still.
No. 6,881.
2 Sheets—Sheet 1.
Patented Nov. 20, 1849.
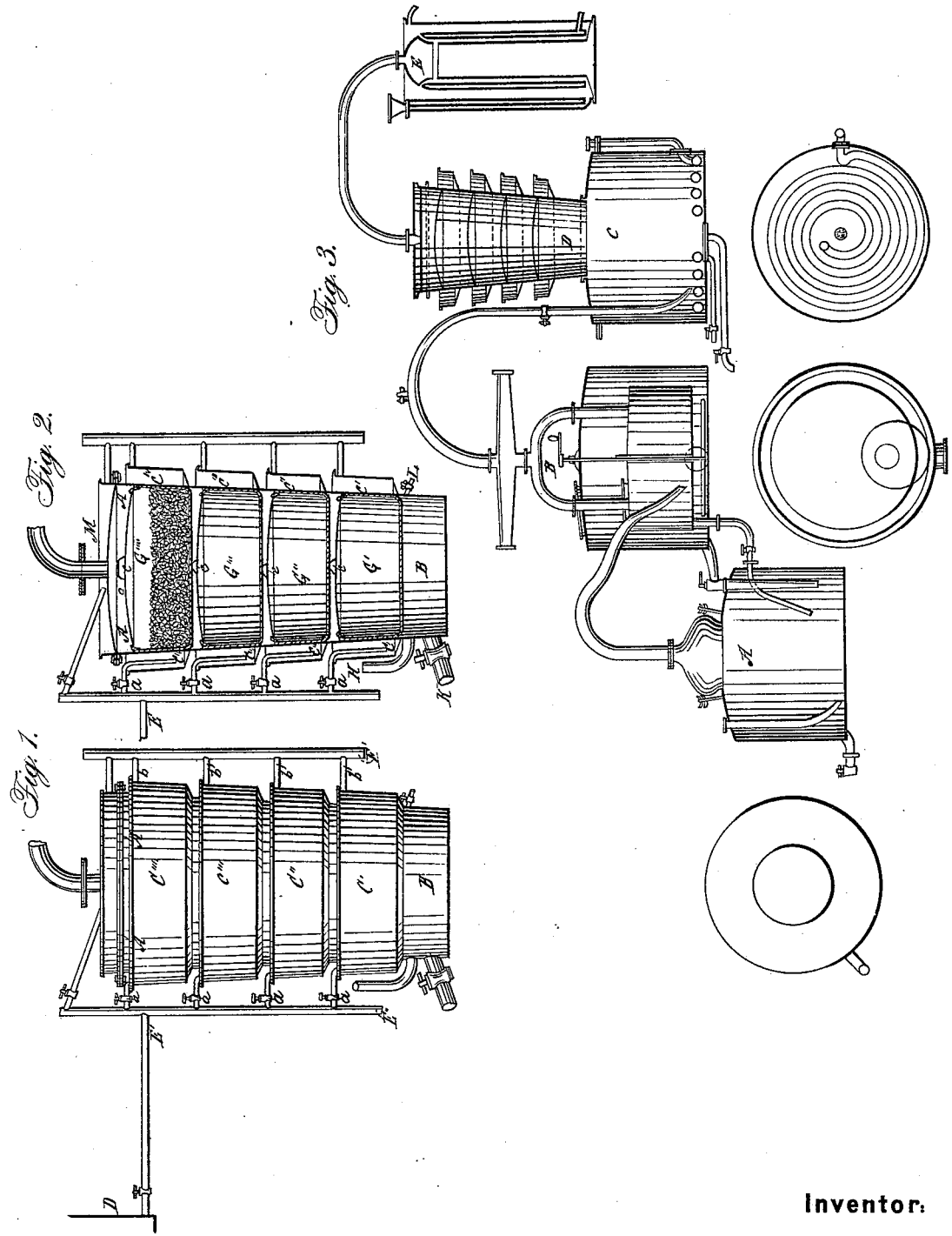
Inventor:
Carl Falkman

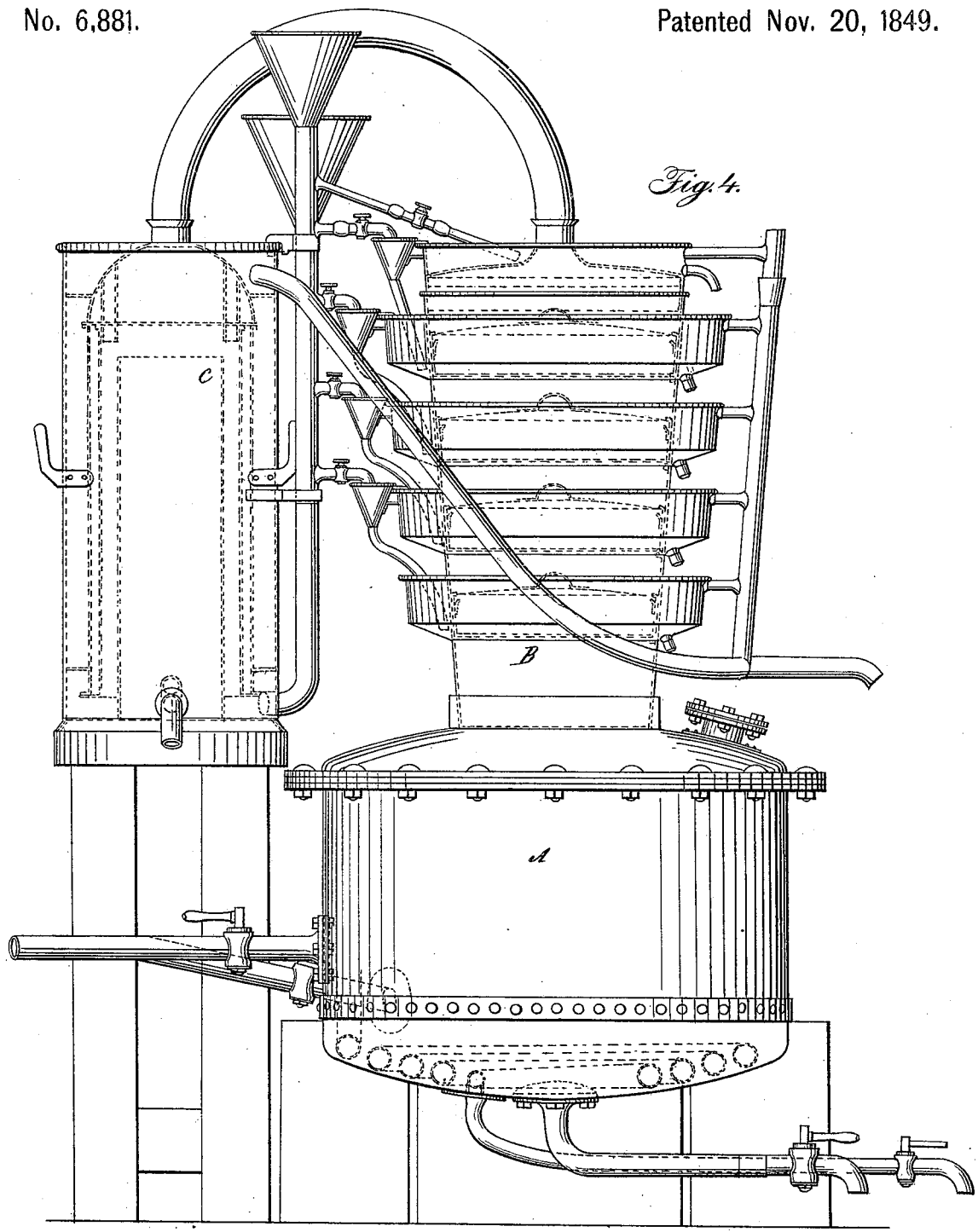

UNITED STATES PATENT OFFICE.

CARL FALKMAN, OF STOCKHOLM, SWEDEN.

IMPROVEMENT IN DISTILLING AND RECTIFYING SPIRITS.

Specification forming part of Letters Patent No. 6,881, dated November 20, 1849.

*To all whom it may concern:*

Be it known that I, CARL FALKMAN, of Stockholm, in the Kingdom of Sweden, have invented new and useful Improvements in the Apparatus for Purifying and Rectifying Spirits; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1 is an elevation, and Fig. 2 a vertical section, of the purifying and rectifying apparatus. Fig. 3 is an elevation of the apparatus applied to a distilling-pan to receive the spirits to be purified; and Fig. 4 is a vertical section of the apparatus combined with a distillery for producing pure oil or free spirits direct from the grain.

The objects and advantages of my invention are, first, that the purification and rectification of spirits are effected simultaneously; second, that by one single operation is obtained a spirit perfectly free from the essential oil of grain spirit and sufficiently concentrated for all technical (artistical) and pharmaceutic purposes, and by only two distillations is obtained perfectly pure or absolute alcohol; third, that during the continuance of the process the product or distilled spirit may be kept at the same percentage of pure alcohol or at the same alcoholic strength, and thus it is indifferent what may be the strength of the raw material (spirit) for obtaining the result referred to under the second head of advantages; fourth, that the combination of spirits with any kind of volatile ingredient used in the preparation of cordials or special liquors—such as gin, liquors, essences, &c.—may be effected with the greatest ease and certainty during the process of distillation; fifth, that the apparatus, notwithstanding it possesses these advantages, is simple in construction and can be disconnected and cleaned with ease; sixth, and finally, that a great saving is effected in the raw material, in the time required for the operation, in fuel, in the quantity of clarifying substances and of such ingredients as are to be incorporated with the spirits.

To these ends the principle of my invention consists in causing the vapor from a still to pass through a purifier and rectifier on its way to the usual condenser in which it is to be concentrated to a liquid, which said purifier and rectifier contains the substance or substances for clarifying and purifying or imparting any desired scent or flavor to the spirits, through which substance or substances the vapor must pass on its way to the usual condenser, where it is concentrated in a liquid.

In Figs. 1 and 2 of the accompanying drawings, which represent my improved purifier and rectifier apparatus, A B represent a hollow vessel in the form of an inverted frustum of a cone, with a pipe, H, near the bottom, through which the vapor of spirits is introduced from a still, and another pipe, I, at top, through which it escapes to be conducted to any desired kind of condenser to be concentrated into a liquid.

Within the vessel A B are arranged at equal distances apart a series of sieves, $G' \, G'' \, G''' \, G^{iv}$, each having a lid, $c$, leaving an open space all around of about half an inch for the passage of the vapor from the one sieve to the other and finally to the exit-pipe I. These sieves are to contain coarse crushed charcoal, as shown at $G^{iv}$, and other substances for clarifying or purifying the vapor and such other substances as are to be used for giving any required scent or flavor to the spirits.

The vessel A B is surrounded by a series of coolers, $C' \, C'' \, C''' \, C^{iv}$, corresponding with the positions of the sieves and surrounding them. The required flow of water is to be these coolers by the main feed-pipe E and branch pipes $a\,a\,a\,a$, each branch having a regulating-cock, and carried off by the branch pipes $b\,b\,b\,b$ and main escape-pipe F, so that by the stop-cocks in the branch supply-pipes $a\,a\,a\,a$ the flow of water can be regulated at pleasure. The cover M of the vessel A B is surrounded by a flange, that it may be supplied with water in the same manner as the coolers and for like purpose. The bottom of the vessel is provided with a discharge-pipe, K, for discharging the apparatus when required. The several sieves fit the inside of the conical vessel, so that when the cover is taken off they can all be removed for cleansing and changing the contained substances. As the vapor enters the lower part of the vessel A B it is partially cooled and concentrated, and passes successively through each sieve and in contact with the substances which they contain for clarifying, purifying, &c., the spirits, and after being thus acted it escapes in the pure and finished state to the final condenser.

In Fig. 3 my improved apparatus is represented at B as combined with a pan, A, into which is put the spirits to be purified, &c., and also with a condenser, C. The pan A can be heated by being placed directly over a fire or by means of pipes; and in Fig. 4, A represents the still; B, the grain-warmer; C, the rectifying apparatus, and E the condenser, and as the various parts connected and combined with my improved apparatus have nothing peculiar in their structure it is not deemed necessary to describe them, for they are well known to all acquainted with the construction of distilling apparatus.

I do not wish to confine myself to the special construction of the apparatus herein described, as this may be variously modified without changing the principle of my invention; but

What I claim as my invention, and desire to secure by Letters Patent of the United States, is—

The method of purifying and rectifying spirits or giving any desired scent or flavor thereto by causing the vapor of spirits to pass through a partial cooler containing the required substances for purifying, rectifying, and impregnating it, substantially as described, whereby the vapor of spirits in passing through the said apparatus under the combined action of partial cooling is concentrated and purified and separated from water and the substances employed for imparting odors or flavors, as described, and this I claim irrespective of the kind of substance or substances, separately or connectedly, which may be used for producing the chemical effects on the spirit-vapor.

CARL FALKMAN. [L. S.]

Witnesses:
   AUGN. MONTELIUS,
   R. L. WIRRMAN.